(12) United States Patent
McMahon et al.

(10) Patent No.: US 7,005,974 B2
(45) Date of Patent: Feb. 28, 2006

(54) VEHICLE IMAGING SYSTEM (75) Inventors: Martha A. McMahon, Ann Arbor, MI (US); Robert L. Bingle, Holland, MI (US)

(73) Assignee: Donnelly Corporation, Holland, MI (US)

( * ) Notice: Subject to any disclaimer, the term of this patent is extended or adjusted under 35 U.S.C. 154(b) by 316 days.

(21) Appl. No.: 10/418,486

(22) Filed: Apr. 18, 2003

(65) Prior Publication Data

US 2004/0032321 A1 Feb. 19, 2004

Related U.S. Application Data (60) Provisional application No. 60/373,932, filed on Apr. 19, 2002, provisional application No. 60/376,508, filed on Apr. 30, 2002.

(51) Int. Cl.
*B60Q 1/00* (2006.01)

(52) U.S. Cl. .................. 340/435; 340/436; 340/933; 340/870.07; 248/200; 396/419

(58) Field of Classification Search ................ 340/435, 340/436, 901, 902, 903, 933, 937, 425.5, 340/870.01, 870.07; 248/200; 396/419
See application file for complete search history.

(56) References Cited

U.S. PATENT DOCUMENTS

| 3,947,095 | A | 3/1976 | Moultrie | 350/302 |
|---|---|---|---|---|
| 4,214,266 | A | 7/1980 | Myers | 358/108 |
| 4,277,804 | A | 7/1981 | Robison | 358/108 |
| 4,626,850 | A | 12/1986 | Chey | 340/903 |
| 4,892,345 | A | 1/1990 | Rachael, III | 296/24.1 |
| 4,937,796 | A | 6/1990 | Tendler | 367/116 |
| 5,121,200 | A | 6/1992 | Choi | 358/103 |
| 5,406,395 | A | 4/1995 | Wilson et al. | 359/15 |
| 5,414,461 | A | 5/1995 | Kishi et al. | 348/115 |
| 5,535,314 | A | 7/1996 | Alves et al. | 395/131 |
| 5,550,677 | A | 8/1996 | Schofield et al. | 359/604 |
| 5,574,443 | A | 11/1996 | Hsieh | 340/901 |
| 5,648,835 | A | 7/1997 | Uzawa | 396/429 |
| 5,668,663 | A | 9/1997 | Varaprasad et al. | 359/608 |
| 5,670,935 | A | 9/1997 | Schofield et al. | 340/461 |
| 5,680,123 | A | 10/1997 | Lee | 340/937 |
| 5,724,187 | A | 3/1998 | Varaprasad et al. | 359/608 |
| 5,760,828 | A | 6/1998 | Cortes | 348/143 |
| 5,786,722 | A | 7/1998 | Schofield et al. | 340/903 |
| 5,796,094 | A | 8/1998 | Schofield et al. | 250/208.1 |

(Continued)

FOREIGN PATENT DOCUMENTS

DE 2931368 A1 8/1979

(Continued)

*Primary Examiner*—Jeffery Hofsass
*Assistant Examiner*—Daniel Previl
(74) *Attorney, Agent, or Firm*—Van Dyke, Gardner, Linn & Burkhart, LLP (57) ABSTRACT

A vehicle imaging system includes an imaging sensor having a field of view exterior of a vehicle, an image processor and a display. The imaging sensor generates a signal indicative of an image representative of a scene occurring within the field of view. The image processor receives the signal from the imaging sensor and processes the signal to detect at least one relevant object within the image. The display is operable to display at least one iconistic representation of the at least one detected relevant object in response to an output signal generated by the image processor. The display is positionable within the vehicle and is viewable by a driver or passenger or occupant of the vehicle. The imaging sensor may be mounted to a mounting bracket mounted at a license plate area of the vehicle.

34 Claims, 4 Drawing Sheets

U.S. PATENT DOCUMENTS

| | | | |
|---|---|---|---|
| 5,798,575 A | 8/1998 | O'Farrell et al. | 307/10.1 |
| 5,914,815 A | 6/1999 | Bos | 359/571 |
| 5,929,786 A | 7/1999 | Schofield et al. | 340/903 |
| 5,949,331 A | 9/1999 | Schofield et al. | 340/461 |
| 5,959,367 A | 9/1999 | O'Farrell et al. | 307/10.1 |
| 5,982,544 A | 11/1999 | Ogata | 359/565 |
| 6,097,023 A | 8/2000 | Schofield et al. | 250/208.1 |
| 6,100,795 A * | 8/2000 | Otterbacher et al. | 340/431 |
| 6,115,651 A | 9/2000 | Cruz | 701/1 |
| 6,175,164 B1 | 1/2001 | O'Farrell et al. | 307/10.1 |
| 6,175,300 B1 * | 1/2001 | Kendrick | 340/436 |
| 6,198,409 B1 | 3/2001 | Schofield et al. | 340/903 |
| 6,201,642 B1 | 3/2001 | Bos | 359/565 |
| 6,222,447 B1 | 4/2001 | Schofield et al. | 340/461 |
| 6,313,454 B1 | 11/2001 | Bos et al. | 250/208.1 |
| 6,320,176 B1 | 11/2001 | Schofield et al. | 250/208.1 |
| 6,353,392 B1 | 3/2002 | Schofield et al. | 340/602 |
| 6,396,397 B1 * | 5/2002 | Bos et al. | 340/461 |
| 6,429,789 B1 * | 8/2002 | Kiridena et al. | 340/905 |
| 6,446,999 B1 * | 9/2002 | Davis, Jr. | 280/477 |
| 6,590,719 B1 | 7/2003 | Bos | 359/753 |
| 6,592,230 B1 * | 7/2003 | Dupay | 359/839 |
| 6,654,670 B1 * | 11/2003 | Kakinami et al. | 701/1 |
| 2002/0003571 A1 | 1/2002 | Schofield et al. | 348/148 |
| 2002/0048086 A1 | 4/2002 | Bos | 359/566 |
| 2002/0159270 A1 | 10/2002 | Lynam et al. | 362/492 |

FOREIGN PATENT DOCUMENTS

| | | |
|---|---|---|
| DE | 3248511 A1 | 7/1984 |
| EP | 0416222 A2 | 3/1991 |
| EP | 0513476 A1 | 11/1992 |
| FR | 2241085 | 3/1975 |
| FR | 2585991 | 2/1987 |
| FR | 2673499 | 9/1992 |
| GB | 934037 | 8/1963 |
| GB | 2137573 A | 10/1984 |
| GB | 2244187 A | 11/1991 |
| GB | 2327823 A | 2/1999 |
| JP | 5539843 | 3/1980 |
| JP | 58209635 | 12/1983 |
| JP | 62122487 | 6/1987 |
| JP | 62122844 | 6/1987 |
| JP | 361192 | 3/1991 |
| JP | 3151829 | 1/1993 |
| WO | 9638319 | 12/1996 |

* cited by examiner

VEHICLE IMAGING SYSTEM

CROSS REFERENCE TO RELATED APPLICATIONS

The present application claims priority of U.S. provisional applications, Ser. No. 60/373,932, filed Apr. 19, 2002 by McMahon for VEHICLE IMAGING SYSTEM and Ser. No. 60/376,508, filed Apr. 30, 2002 by Bingle for VEHICLE LICENSE PLATE BRACKET which are hereby incorporated herein by reference in their entireties.

FIELD OF THE INVENTION

The present invention relates to a vehicle imaging system and, more particularly, to a vehicle imaging system useful for a backup or reverse aid to the driver of a vehicle. The present invention is also related to a bracket for mounting an imaging sensor at an exterior portion, such as a rearward portion, of a vehicle.

BACKGROUND OF THE INVENTION

It is known to provide an imaging system for a vehicle which functions to provide a rearward view of the vehicle to a driver via a display within the vehicle. Such systems function to assist a driver in backing up a vehicle to a trailer or otherwise positioning or parking the vehicle at a desired location. However, such systems include a display which is typically a video screen which may be expensive to manufacture and implement with the imaging system.

SUMMARY OF THE INVENTION

The present invention is intended to provide a low cost backup or reverse aid for a vehicle. The reverse aid provides a dot matrix type display which displays a simplified or iconistic representation of a vehicle bumper and/or other portion of the vehicle and any objects detected exteriorly of the vehicle. The present invention is also intended to provide a bracket for mounting an imaging sensor at an exterior or rearward portion of a vehicle in a manner which is not intrusive to the exterior or rearward portion of the vehicle.

According to an aspect of the present invention, a vehicle imaging system includes an imaging sensor, an image processing system or image processor and a display. The image processor may receive a signal or image from the imaging sensor and may process the signal to detect at least one relevant object, such as the vehicle bumper and/or any object or objects near or approaching the vehicle or the vehicle bumper. The image processor may provide for edge detection of an object or objects via an edge detection algorithm or the like. The detected objects are then represented as simple, line or iconistic representations on the display, which may be a low cost dot matrix type display or the like.

The present invention is especially suitable for use during a trailer hitching operation, where the vehicle is moved toward a trailer for connection thereto. In such operations, the driver cannot clearly view the hitch of the trailer as the vehicle is backing up. The display of the present invention provides a general representation of the hitch of the vehicle and the hitch of the trailer as lines in the display, whereby the driver may control or maneuver the vehicle to align the lines or icons with one another. Preferably, the imaging system of the present invention may provide an indication to the driver of the vehicle when the hitches are aligned, such as via flashing the lines or icons in the display or any other means for indicating the alignment to the driver.

According to another aspect of the present invention, a vehicle imaging system comprises an imaging sensor having a field of view, an image processor and a display. The imaging sensor is operable to generate a signal indicative of an image representative of a scene occurring within the field of view. The image processor processes the signal to detect at least one relevant object within the image. The image processor generates an output signal representative of the at least one detected relevant object. The output signal comprises at least one iconistic representation of the at least one detected relevant object. The display is operable to display the at least one iconistic representation of the at least one detected relevant object.

The display may comprise a dot matrix display. The image processor may provide edge detection of objects via an edge detection algorithm or the like. The display may then provide iconistic representations of the detected edges of the at least one relevant object within the image.

The imaging system may display at least one iconistic representation of an exterior vehicle portion, such as a trailer hitch of the vehicle, and at least one target object, such as the hitch of a trailer, as separate icons in the display. The display may provide an indication to the driver of the vehicle when the icons representing the vehicle portion and the target object are generally aligned. The display may provide such an indication via flashing the icons in the display.

The imaging system may be operable to determine a distance between the vehicle and the at least one detected relevant object. The imaging system may be operable to determine the distance in response to a speed at which the at least one detected relevant object moves across the image and a speed of the vehicle.

According to another aspect of the present invention, a method of aligning an exterior portion of a vehicle with a target object exteriorly of the vehicle comprises providing an imaging sensor having a field of view exteriorly of a vehicle and including an exterior portion of the vehicle and at least one target object exteriorly of the vehicle. The imaging sensor generates a signal indicative of an image representative of a scene occurring within the field of view exteriorly of the vehicle. An image processor is provided for processing the signal to detect the exterior portion of the vehicle and the target object within the image. The image processor generates an output signal representative of the exterior portion of the vehicle and the target object. The output signal comprises at least one iconistic representation of the exterior portion of the vehicle and the target object. The at least one iconistic representation of the exterior portion of the vehicle and the target object are displayed at a display. The vehicle is driven or maneuvered to align the at least one iconistic representation of the exterior portion of the vehicle in the display with the at least one iconistic representation of the target object in the display.

According to another aspect of the present invention, an imaging sensor bracket for mounting an imaging sensor to a vehicle includes a mounting portion adapted to be mounted to a license plate mounting hole on a vehicle and a sensor mounting portion extending from the vehicle mounting portion. The sensor mounting portion is angled with respect to the vehicle mounting portion of the bracket such that the sensor mounting portion extends generally rearwardly and generally horizontally when the vehicle mounting portion is fastened to the license plate mounting hole on the vehicle. The sensor mounting portion is adapted to mount or receive an imaging sensor thereon.

The imaging sensor may be an imaging array sensor and may be operable to receive an image of a scene occurring generally rearwardly of the vehicle. The imaging sensor bracket may include a cover which substantially contains the imaging sensor at the sensor mounting portion of the bracket. The cover may provide an opening through which the imaging sensor receives the image of the scene. The cover may be a plastic material and may snap onto the sensor mounting portion of the bracket to substantially enclose the imaging sensor within the cover.

The present invention thus provides an imaging system which is operable to analyze an image of a scene exteriorly of the vehicle and to extract from the sensor or camera the relevant portions of the image. The portions are then displayed as iconistic representations of the objects or portions of the scene, such as simple lines or icons in a dot matrix type display within the vehicle. The driver of the vehicle may view the iconistic representations on the display and control the vehicle accordingly, such as to avoid an object or to align an object, such as a trailer, with the vehicle.

These and other objects, advantages, purposes and features of the present invention will become apparent upon review of the following specification in conjunction with the drawings.

DESCRIPTION OF THE PREFERRED EMBODIMENTS

Figure 1:
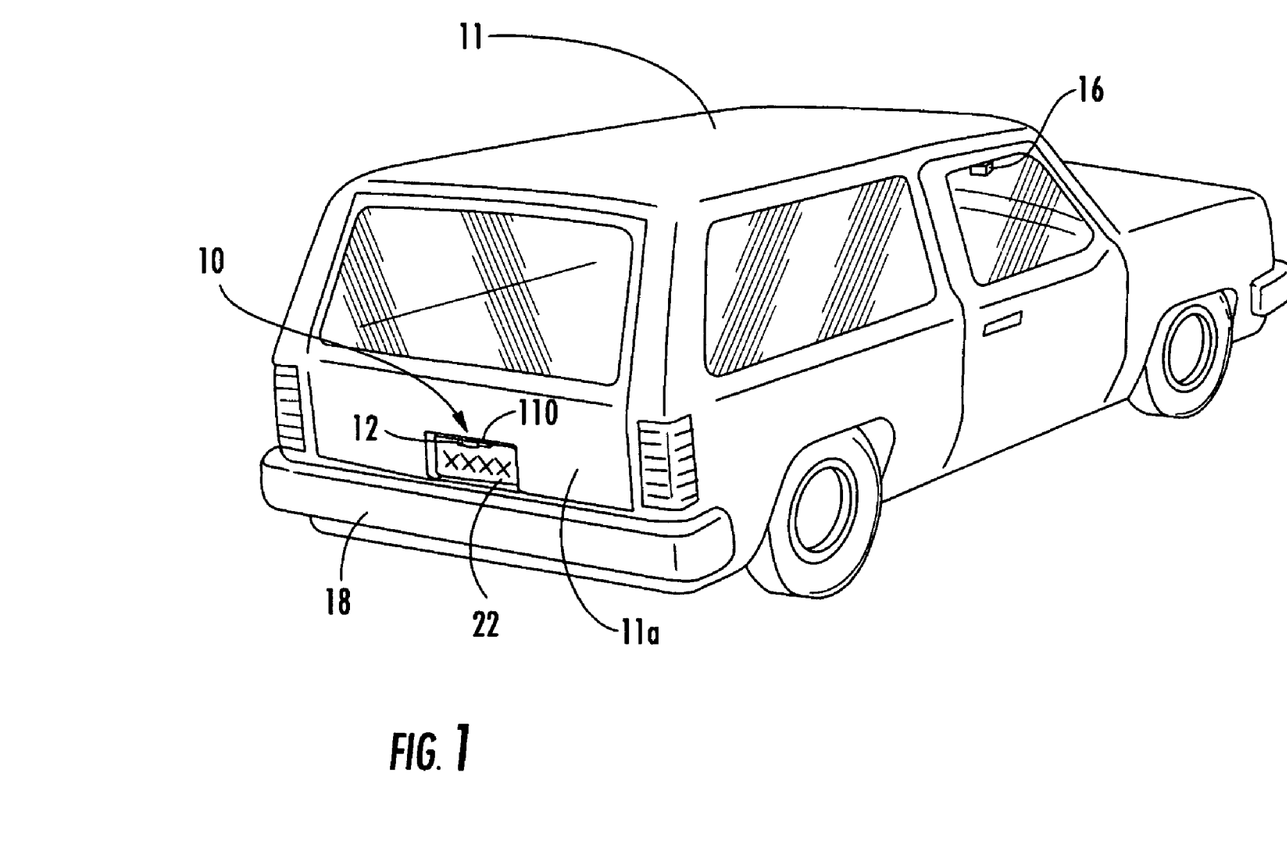
FIG. 1 is a rear perspective view of a vehicle with an imaging system in accordance with the present invention mounted thereon.
Figure 2:
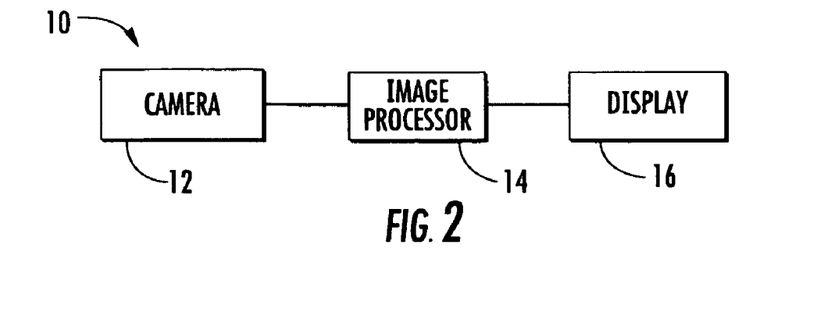
FIG. 2 is a block diagram of the imaging system of the present invention.

Referring now to the drawings and the illustrative embodiments depicted therein, a vehicle imaging system 10 includes an image sensor or camera 12, an image processing system or image processor 14 and a display 16 (FIGS. 1 and 2). The image processing system 14 receives an input or signal from a single camera or multiple cameras positioned at a portion of a vehicle 11, such as at an exterior portion of the vehicle, such as at a rearward exterior portion 11a of the vehicle 11. The camera 12 is operable to capture an image of a scene exteriorly, and preferably rearwardly, of the vehicle. The camera may be any known camera or image sensor, such as an imaging array sensor, such as a CMOS sensor or CCD sensor, such as described in commonly assigned U.S. Pat. Nos. 5,550,677; 6,097,023 and 5,796,094, which are hereby incorporated herein by reference. The image processing system is operable to process the image or signal received from the camera. The display is then operable to display or show an iconistic representation or an outline or line representation of the vehicle's bumper and an iconistic representation or an outline or line representation of any object or objects or obstacles detected by the image processing system.

Optionally, the image processing system may process the image with an edge detection algorithm or process. Using an edge detection algorithm or process allows for differentiation between oil spots and three dimensional objects (including pot holes), as discussed below. Examples of such edge detection algorithms are disclosed in commonly assigned U.S. Pat. Nos. 6,313,454 and 6,353,392, which are hereby incorporated herein by reference.

Optionally, the display may comprise a multi-pixel, dot matrix type of display, such as a VF display or the like. Such a display may provide a low cost display which provides a representation of the objects, but does not include additional details which are not necessary or important to the driver when backing up or otherwise controlling or maneuvering the vehicle.

Figure 3:
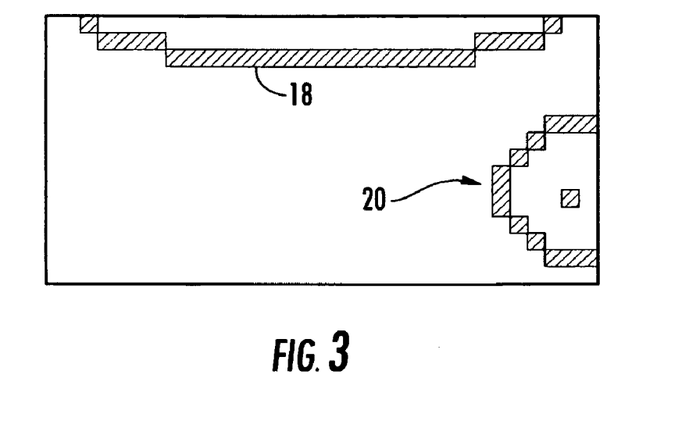
FIG. 3 is an example of an image displayed on a display suitable for use with the imaging system of the present invention.

An example of the iconistic representation of a scene or image as shown on the display 16 of imaging system 10 is shown in FIG. 3. An iconistic or line representation 18 of the vehicle's bumper is shown at the top portion of the display screen and an iconistic or line representation 20 of an object or obstacle is shown at the lower right of the display screen.

Figure 4A:
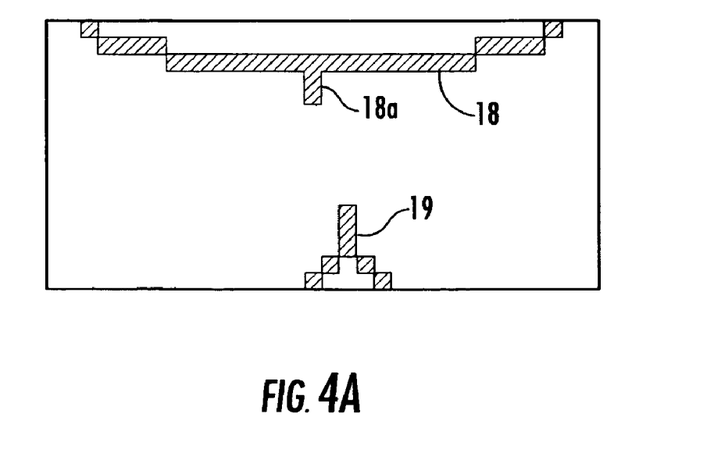
FIGS. 4A and 4B are examples of images displayed on the display as the vehicle approaches a trailer during a hitching operation.
Figure 4B:
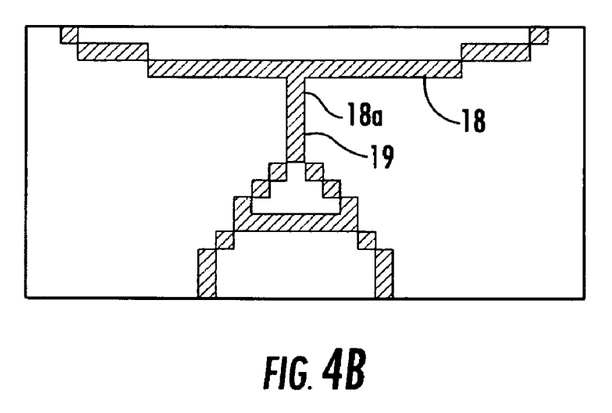

As shown in FIGS. 4A and 4B, for trailer hitching processes or situations, the vehicle's hitch may be shown as a simple line or iconistic representation 18a extending rearwardly from the bumper representation 18 of the vehicle, while the trailer's hitch or tongue may be shown as another line or iconistic representation 19 extending from the trailer. As shown in FIG. 4A, the hitches, and thus the iconistic representations 18a, 19 of the hitches, may not be aligned as the vehicle approaches the trailer.

As the vehicle moves closer to the trailer hitch, the icons or lines 18a, 19 approach one another on the display. The driver may steer or drive or maneuver the vehicle to generally align the icons or lines or outlines representative of the hitches. When the vehicle is in or is approaching the right area or spot for hitching or connecting to the trailer hitch, the display may flash the lines or otherwise indicate that the two icons or lines are aligned to indicate that the hitches are at least generally aligned. FIG. 4B shows the icons 18a, 19 as being aligned, thereby indicating that the hitches are at least generally aligned and in or near the hitch position. At this point the display may flash one or both iconistic representations or otherwise indicate alignment of the hitches to the driver of the vehicle.

Figure 5:
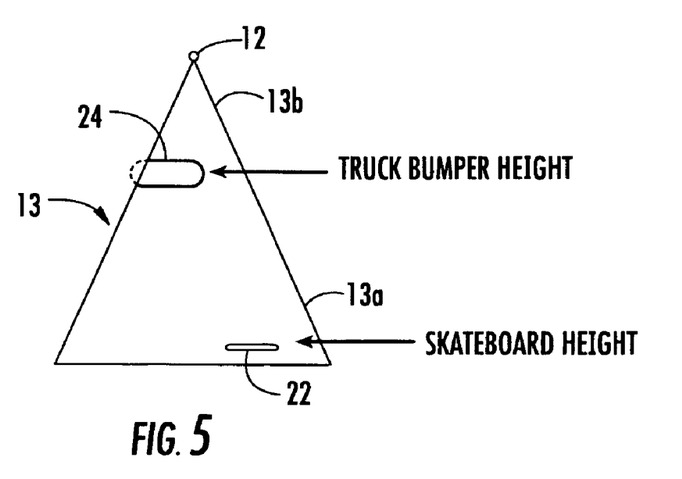
FIG. 5 depicts a cone of sight or field of view of an image sensor useful with the imaging system of the present invention.

The imaging system of the present invention may also provide for a distance measurement between objects and the vehicle. The distance from the vehicle to a detected object may be determined using a combination of vehicle speed and motion of the object through the sensor range or field of view. To determine the height of an object or distance between the sensor and the object once the object is detected, the system may determine how quickly the object moves through the sensor range or field of view as compared to the speed of the vehicle. An object on or near the ground will be at or near the widest part 13a of a cone or field of sight or view 13 of sensor or camera 12 (FIG. 5), whereas a higher object will be at a narrower part or upper portion 13b of the cone or field of sight or view 13. When a stationary object (such as, for example, a skateboard 22 or the like, such as shown in FIG. 5) is on the ground, the leading edge of the object will move more slowly through the sensor range (as the vehicle is moved) than the edge of another object that is a few feet above the ground (such as the bumper of a truck 24). The imaging system of the present invention may then be operable to determine or calculate a height of the detected object in response to the speed of the vehicle and the speed at which the object moves through the range of the sensor or camera. The imaging system may thus determine the distance from the vehicle or from the sensor to the detected object based on the height determination of the object and location of the object within the captured image. The imaging system may then indicate the distance to the driver of the vehicle and may indicate a warning or alert if the distance is within a threshold distance.

Therefore, the present invention provides a camera or image sensor, an image processing system or device and a display (such as a simple dot matrix display, which may be a display-on-demand type of display) for a back up or reversing aid or trailer hitching aid for a vehicle, or for any other vehicle vision system. The display may be part of an interior rearview mirror assembly, and may include a display-on-demand (DOD) type of display (such as disclosed in commonly assigned U.S. pat. application, Ser. No. 10/054,633, filed Jan. 22, 2002 by Lynam et al. for VEHICULAR LIGHTING SYSTEM and/or in commonly assigned U.S. pat. application, Ser. No. 09/793,002, entitled VIDEO MIRROR SYSTEMS INCORPORATING AN ACCESSORY MODULE, filed Feb. 26, 2001. now U.S. Pat. No. 6,690,268 and/or in commonly assigned U.S. Pat. Nos. 5,668,663 and 5,724,187, which are all hereby incorporated by reference herein), which may comprise two displays located in the mirror assembly.

The imaging system of the present invention may be suitable for use with other imaging systems of the vehicle or may utilize principles or aspects of such other systems, such as a video mirror system, such as disclosed in commonly assigned U.S. pat. applications, Ser. No. 09/793,002, filed on Feb. 26, 2001 by Schofield et al., entitled VIDEO MIRROR SYSTEMS INCORPORATING AN ACCESSORY MODULE, now U.S. Pat. No. 6,690,268 and Ser. No. 09/585,379, filed Jun. 1, 2000 for REAR VIEW MIRROR ASSEMBLY WITH UTILITY FUNCTIONS which are hereby incorporated herein by reference, or an exterior imaging system, such as a rear vision system utilizing a mirror mounted or vehicle mounted camera, such as disclosed in commonly assigned U.S. Pat. Nos. 5,959,367; 5,929,786; 5,949,331; 5,914,815; 5,786,772; 5,798,575; 5,670,935; 6,175,164; 6,198,409; 6,201,642 and/or 6,222,447, and/or in commonly assigned U.S. pat. applications, Ser. No. 09/199,907, filed Nov. 25, 1998, entitled WIDE ANGLE IMAGE CAPTURE SYSTEM FOR VEHICLES, now U.S. Pat. No. 6,717,610 Ser. No. 10/010,862, filed Dec. 6, 2001, entitled PLASTIC LENS SYSTEM FOR VEHICLE IMAGING SYSTEM, now U.S. Pat. No. 6,757,109 and/or Ser. No. 09/372,915, filed Aug. 12, 1999, entitled VEHICLE IMAGING SYSTEM WITH STEREO IMAGING, now U.S. Pat. No. 6,396,397 which are all hereby incorporated herein by reference in their entireties.

Although shown and described as being suitable for viewing and displaying images representative of a scene occurring exteriorly of the vehicle, such as rearwardly of the vehicle, it is envisioned that the imaging system of the present invention may be equally suitable for use as an interior imaging system for viewing and displaying images representative of scenes occurring interiorly of the vehicle. For example, the imaging system may capture images of scenes occurring within the cabin of the vehicle or within the trunk compartment or other interior compartment of the vehicle or the like, and may display iconistic representations of occupants and/or objects within the cabin or trunk of the vehicle.

Figures 6, 7, 8, 9:
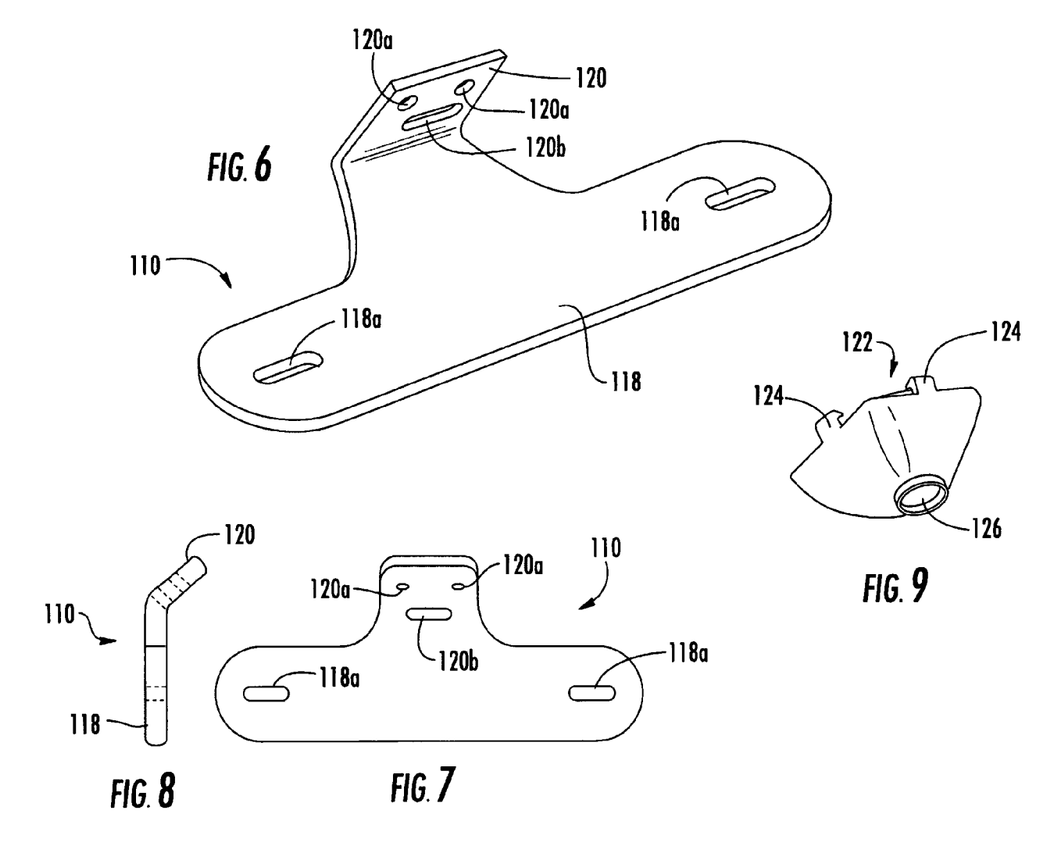
FIG. 6 is a perspective view of an imaging sensor bracket in accordance with the present invention.
FIG. 7 is a rear elevation of the imaging sensor bracket of FIG. 6.
FIG. 8 is a side elevation of the imaging sensor bracket of FIGS. 6 and 7.
FIG. 9 is a perspective view of a cover useful with the imaging sensor bracket of the present invention.

Referring now to FIGS. 6–8, a mounting bracket 110 for imaging sensor 12 is mountable at the license plate mounting area 22 of vehicle 11. As shown in FIGS. 6–8, mounting bracket 110 includes a vehicle mounting portion or flange 118 and an imaging sensor mounting portion or flange 120. Mounting bracket 110 may comprise a metal or plastic bracket. Mounting bracket 110 provides a generally centrally located mounting area for imaging sensor 12 which does not require modification of the rear portion or panel 11a of vehicle 11.

Vehicle mounting portion 118 is a generally flat or planar plate with at least one mounting hole 118a therethrough. The mounting hole 118a is adapted to receive a license plate mounting fastener therethrough to retain mounting bracket 110 to the vehicle 11. Vehicle mounting portion 118 may include a pair of mounting holes 118a at opposite ends of the vehicle mounting portion for securing the bracket 110 to the vehicle by both of the license plate fasteners of the vehicle 11.

Imaging sensor mounting portion 120 extends from vehicle mounting portion 118, such as upwardly and generally rearwardly form vehicle mounting portion 118 when vehicle mounting portion 118 is mounted to the vehicle. In the illustrated embodiment, sensor mounting portion 120 includes a pair of fastening openings 120a for mounting or receiving imaging sensor 12. The imaging sensor 12 may be mounted to sensor mounting portion 120 via any fastening means, such as screws, bolts, tape (whereby the fastening openings may not be necessary) or the like, without affecting the scope of the present invention. Sensor mounting portion 120 may also include a passageway 120b for the vehicle wiring harness to pass through to provide power and control to the imaging sensor 12. The angle at which sensor mounting portion 120 extends from vehicle mounting portion 118 may be selected depending on the particular vehicle, the type of imaging system associated with the imaging sensor, and/or the desired viewing angle of the imaging sensor.

As shown in FIG. 9, a cosmetic cover 122 may be provided which snaps on or is otherwise secured to sensor mounting portion 120 to substantially encase or contain the imaging sensor 12. For example, cover 122 may include a plurality of flexible tabs 124 which may snap around the perimeter edges of the sensor mounting portion 120 (or which may snap within or through slots or the like in the sensor mounting portion) to retain cover 122 to the sensor mounting portion 120 of mounting bracket 10. Cover 122 includes an aperture or opening 126 through which the imaging sensor 12 receives the image of the rearward scene. Cover 122 provides an improved appearance to the bracket and imaging sensor and may provide additional protection to the imaging sensor by reducing the exposure of the imaging sensor to adverse weather conditions or impact with objects or the like. However, because the license plate mounting areas of most vehicles is a recessed area at a rear (or front) portion of the vehicle, the imaging sensor is already positioned in an area where it is substantially protected from exposure and impact.

Mounting bracket 110 may thus be mounted to an existing vehicle, such as an aftermarket installation, by removing the license plate fasteners, placing the vehicle mounting portion 118 at the vehicle so as to align the mounting holes 118a with the threaded holes in the license plate mounting area 22 of the vehicle 11, and then inserting the license plate fasteners through the license plate holes and the mounting holes 118a and securing the fasteners back into their threaded holes at the license plate mounting area of the vehicle. Preferably, the mounting holes 118a are slotted to ease alignment with the threaded holes at the license plate mounting area of the vehicle. The mounting portion 118 of mounting bracket 110 may be placed between the license plate mounting area of the vehicle and the license plate of the vehicle, such that the mounting portion 18 is not visible or noticeable. The sensor mounting portion 120 may extend generally rearwardly from the mounting portion 118 to position the imaging sensor 12 immediately rearward of the license plate of the vehicle and generally above or at an upper region of the license plate.

The imaging sensor mounted to bracket 110 may comprise an imaging array sensor, such as a CMOS sensor or a CCD sensor or the like, such as disclosed in commonly assigned U.S. Pat. Nos. 5,550,677; 5,670,935; and 5,796,094, which are hereby incorporated herein by reference. Because the mounting bracket of the present invention may provide a central mounting position of the imaging sensor, the imaging sensor mounted to the mounting bracket may be particularly suitable for use in rearward vision systems, such as reverse or backup aids, such as the imaging system 10 described above, or such as other imaging or vision systems utilizing the principles disclosed in U.S. Pat. Nos. 5,550,677; 5,670,935; and 6,201,642, and/or in U.S. pat. application, Ser. No. 09/199,907, filed Nov. 25, 1998 by Bos et al. for WIDE ANGLE IMAGE CAPTURE SYSTEM FOR VEHICLE, now U.S. Pat. No. 6,717,610 and/or in U.S. provisional application, Ser. No. 60/373,972, filed Apr. 19, 2002 by McMahon for VEHICLE IMAGING SYSTEM which are all hereby incorporated herein by reference. However, the imaging sensor may be implemented and operated in connection with various other vehicular systems, such as a forwardly directed vehicle vision system (if the mounting bracket is mounted at a forward license plate mounting area), a lane departure warning system, a system for determining a distance to a trailing (or leading) vehicle or object, such as using the principles disclosed in U.S. pat. application, Ser. No. 09/372,915, filed Aug. 12, 1999 by Bos et al. for VEHICLE IMAGING SYSTEM WITH STEREO IMAGING, now U.S. Pat. No. 6,396,397 which is hereby incorporated herein by reference, a rain sensor, such as the types disclosed in commonly assigned U.S. Pat. Nos. 6,353,392; 6,313,454; and/or 6,320,176, which are hereby incorporated herein by reference, and/or the like, without affecting the scope of the present invention.

Therefore, the mounting bracket of the present invention provides for a generally concealed mount for an imaging sensor, without requiring any modification to the structure of the vehicle. The mounting bracket of the present invention may simply mount to the vehicle by removing the existing license plate, placing the bracket over the license plate mounting hole pattern, placing the license plate over the bracket and screwing the plate screws back into the license plate mounting holes. The imaging sensor or camera is mounted on the upper flange or portion of the bracket by screws, mounting tape or other mounting methods. The angle of the flange can be adjusted to meet the specific needs of the vehicle and/or vision system.

The present invention thus may provide a supplemental mounting scheme for vehicles that are being retro-fitted with a reverse aid, tow check or other camera system. The mounting bracket thus may provide a suitable or optimal mounting position for an imaging sensor for installations on vehicles which do not have a location available on the vehicle that is suitable for mounting a camera which will perform as expected.

Because most camera or imaging systems or applications require the camera to be mounted on the vehicle centerline for optimum camera functionality, the mounting bracket of the present invention provides a mounting location on the centerline for desired results, even on vehicles that may not have space available on or at or near the vehicle center to mount a camera. By mounting the bracket partially behind the license plate, the present invention provides a mostly hidden bracket/image sensor assembly, which also hides the wire harness which may be routed out from behind the license plate. The mounting bracket of the present invention also eliminates the need to drill holes in the sheet metal of the vehicle, which is important, since most people are not comfortable drilling holes or having holes drilled in their vehicle. A cosmetic cover can be applied for an even more clean and appealing appearance to the image sensor of the camera system of the vehicle.

Changes and modifications in the specifically described embodiments may be carried out without departing from the principles of the present invention, which is intended to be limited only by the scope of the appended claims, as interpreted according to the principles of patent law.

The embodiments of the invention in which an exclusive property or privilege is claimed are defined as follows:

1. A vehicle imaging system for a vehicle comprising:
an imaging sensor having a field of view at least one of interior of the vehicle and exterior of the vehicle, said imaging sensor generating a signal indicative of an image representative of a scene occurring within the field of view;
an image processor processing said signal to detect first and second relevant objects within said image, said first relevant object comprising a portion of the vehicle, said image processor generating an output signal representative of said first and second detected relevant objects, wherein said output signal is indicative of first and second iconistic representations of said first and second detected relevant objects; and
a low cost, multi-pixel display operable to display said first and second iconistic representations of said first and second detected relevant objects, whereby a viewer can determine the positional relationship of said second relevant object to said first relevant object by viewing said first and second iconistic representations at said display.

2. The vehicle imaging system of claim 1, wherein said display comprises a dot matrix display.

3. The vehicle imaging system of claim 1, wherein said image processor provides edge detection of said first and second relevant objects via an edge detection algorithm.

4. The vehicle imaging system of claim 3, wherein said display provides line representations of the detected edges of said first and second detected relevant objects in an exterior scene.

5. The vehicle imaging system of claim 1, wherein said imaging sensor is directed generally exteriorly of the vehicle and has an exterior field of view, said display displaying the positional relationship of said second relevant object relative to said first relevant object as the vehicle is moved relative to said second relevant object.

6. The vehicle imaging system of claim 1, wherein said imaging sensor is mountable at a rear portion of the vehicle such that said imaging sensor has an exterior field of view rearward of the vehicle.

7. The vehicle imaging system of claim 6, wherein said rearward field of view includes a trailer hitch of the vehicle.

8. The vehicle imaging system of claim 7, wherein said first iconistic representation comprises at least one iconistic representation of the trailer hitch of the vehicle and said second iconistic representation comprises at least one iconistic representation of a hitch of a trailer positioned generally rearward of the vehicle.

9. The vehicle imaging system of claim 8, wherein said at least one iconistic representation of the trailer hitch of the vehicle and said at least one iconistic representation of the hitch of the trailer are displayed as separate icons in said display.

10. The vehicle imaging system of claim 9, wherein said display provides an indication to the driver of the vehicle when said iconistic representations of the trailer hitch of the vehicle and the hitch of the trailer are generally aligned.

11. The vehicle imaging system of claim 10, wherein said indication comprises flashing of said iconistic representations in said display.

12. The vehicle imaging system of claim 1 including an imaging sensor bracket for mounting said imaging sensor to the vehicle.

13. The vehicle imaging system of claim 12, wherein said imaging sensor and said imaging sensor bracket are mountable at a license plate mounting portion of the vehicle.

14. The vehicle imaging system of claim 13, wherein said imaging sensor bracket comprises a mounting portion adapted to be mounted to a mounting hole for a license plate on a vehicle and a sensor mounting portion extending from said vehicle mounting portion.

15. The vehicle imaging system of claim 14, wherein said sensor mounting portion is angled with respect to said vehicle mounting portion such that said sensor mounting portion extends generally rearwardly and generally horizontally when said vehicle mounting portion is fastened to the license plate mounting hole on the vehicle.

16. The vehicle imaging system of claim 15, wherein said imaging sensor bracket includes a cover which substantially contains said imaging sensor at said sensor mounting portion of said imaging sensor bracket.

17. The vehicle imaging system of claim 16, wherein said cover provides an opening through which said imaging sensor receives light representative of said exterior scene.

18. The vehicle imaging system of claim 1, wherein said imaging system is operable to determine a distance between the vehicle and said second detected relevant object.

19. The vehicle imaging system of claim 18, wherein said imaging system is operable to determine said distance in response to a speed which said second detected relevant object moves across the field of view and a speed of the vehicle.

20. A method of aligning a portion of a vehicle with a target object exteriorly of the vehicle comprising:

providing an imaging sensor, said imaging sensor having a field of view exteriorly of the vehicle and encompassing an exterior portion of the vehicle, said imaging sensor generating a signal indicative of an image representative of a scene occurring within the field of view exteriorly of the vehicle;

providing an image processor for processing said signal to detect the exterior portion of the vehicle and to detect a target object exteriorly of the vehicle within said image, said image processor generating an output signal representative of the exterior portion of the vehicle and the target object, wherein said output signal comprises at least one iconistic representation of at least the exterior portion of the vehicle and at least one iconistic representation of the target object;

displaying said at least one iconistic representation of at least the exterior portion of the vehicle and said at least one iconistic representation of the target object at a display; and maneuvering the vehicle to align said at least one iconistic representation of the exterior portion of the vehicle in the display with said at least one iconistic representation of the target object in the display.

21. The method of claim 20, wherein the exterior portion of the vehicle comprises a rear portion and a trailer hitch of the vehicle and the target object comprises a hitch of a trailer, said imaging system being operable to indicate when the trailer hitch of the vehicle is generally aligned with the hitch of the trailer.

22. The method of claim 21, wherein said at least one iconistic representation of the trailer hitch of the vehicle and said at least one iconistic representation of the hitch of the trailer are displayed as lines in said display.

23. The method of claim 21 including indicating when the trailer hitch of the vehicle and the hitch of the trailer are generally aligned.

24. The method of claim 23, wherein indicating when the trailer hitch of the vehicle and the hitch of the trailer are generally aligned comprises flashing of at least one of said iconistic representations in said display.

25. The method of claim 20, wherein said image processor comprises an edge detection algorithm and is operable to detect edges of the exterior portion of the vehicle and the target object.

26. The method of claim 25, wherein said display is operable to display the detected edges of the exterior portion of the vehicle and the target object.

27. The method of claim 20, wherein said display comprises a dot matrix display.

28. The method of claim 20 including determining a distance between the vehicle and the target object.

29. The method of claim 28, wherein determining a distance comprises determining a distance between the vehicle and the target object in response to a speed which the target object moves across the field of view and a speed of the vehicle.

30. The method of claim 20 including mounting said imaging sensor at a license plate of the vehicle.

31. The method of claim 30 including mounting said imaging sensor at an imaging sensor bracket and mounting said imaging sensor bracket at the license plate of the vehicle.

32. The method of claim 31, wherein said imaging sensor bracket comprises a mounting portion adapted to be mounted to a mounting hole for the license plate on a vehicle and a sensor mounting portion extending from said vehicle mounting portion.

33. The method of claim 32, wherein said sensor mounting portion is angled with respect to said vehicle mounting portion such that said sensor mounting portion extends generally rearwardly and generally horizontally when said vehicle mounting portion is fastened to the license plate mounting hole on the vehicle.

34. The method of claim 33 including providing a cover which substantially contains said imaging sensor at said sensor mounting portion of said imaging sensor bracket.

* * * * *

UNITED STATES PATENT AND TRADEMARK OFFICE
CERTIFICATE OF CORRECTION

PATENT NO.         : 7,005,974 B2                                            Page 1 of 1
APPLICATION NO. : 10/418486
DATED              : February 2, 2006
INVENTOR(S)        : Martha A. McMahon and Robert L. Bingle It is certified that error appears in the above-identified patent and that said Letters Patent is hereby corrected as shown below:

<u>Column 6:</u>
Line 51, "bracket 10" should be --bracket 110--.

<u>Column 7:</u>
Line 10, "portion 18" should be --portion 118--.

<u>Column 8:</u>
Line 46, Claim 1, Insert --relative-- after "object".

Signed and Sealed this

Third Day of June, 2008

JON W. DUDAS
*Director of the United States Patent and Trademark Office*

UNITED STATES PATENT AND TRADEMARK OFFICE
CERTIFICATE OF CORRECTION

PATENT NO. : 7,005,974 B2  Page 1 of 1
APPLICATION NO. : 10/418486
DATED : February 28, 2006
INVENTOR(S) : Martha A. McMahon and Robert L. Bingle It is certified that error appears in the above-identified patent and that said Letters Patent is hereby corrected as shown below:

Column 6:
Line 51, "bracket 10" should be --bracket 110--.

Column 7:
Line 10, "portion 18" should be --portion 118--.

Column 8:
Line 46, Claim 1, Insert --relative-- after "object".

This certificate supersedes the Certificate of Correction issued June 3, 2008.

Signed and Sealed this

First Day of July, 2008

JON W. DUDAS
*Director of the United States Patent and Trademark Office*